(12) United States Patent
Davis

(10) Patent No.: US 11,312,339 B2
(45) Date of Patent: Apr. 26, 2022

(54) SNOW/ICE CLEANING TOOL AND METHOD

(71) Applicant: Shawn Allen Davis, East Freetown, MA (US)

(72) Inventor: Shawn Allen Davis, East Freetown, MA (US)

(73) Assignee: AllenPro Design LLC, Fairhaven, MA (US)

( * ) Notice: Subject to any disclaimer, the term of this patent is extended or adjusted under 35 U.S.C. 154(b) by 87 days.

(21) Appl. No.: 16/828,894

(22) Filed: Mar. 24, 2020

(65) Prior Publication Data
US 2021/0300304 A1    Sep. 30, 2021

Related U.S. Application Data

(60) Provisional application No. 62/822,967, filed on Mar. 24, 2019.

(51) Int. Cl.
| | |
|---|---|
| *B60S 3/04* | (2006.01) |
| *A46B 5/00* | (2006.01) |
| *A46B 15/00* | (2006.01) |
| *A47L 13/12* | (2006.01) |

(52) U.S. Cl.
CPC .............. *B60S 3/045* (2013.01); *A46B 5/005* (2013.01); *A46B 15/0095* (2013.01); *A46B 15/0081* (2013.01); *A46B 2200/3046* (2013.01); *A47L 13/12* (2013.01)

(58) Field of Classification Search
CPC .. B60S 3/045; A47L 1/06; A47L 13/08; A47L 13/022; A47L 13/12; A47L 13/11; B25J 1/04; A46B 5/005; A46B 15/0081; A46B 15/0095; A46B 2200/3046; A46B 15/0055; A46B 5/0087; A46B 5/0008; B25G 1/04; B25G 3/38
USPC .... 15/111, 105, 121, 117, 236, 245; 294/24; 194/26
See application file for complete search history.

(56) References Cited

U.S. PATENT DOCUMENTS

| | | | | |
|---|---|---|---|---|
| 5,913,558 | A * | 6/1999 | Simons ..................... | A47L 1/06 294/24 |
| 9,167,889 | B1* | 10/2015 | Ihde ................... | A46B 15/0081 |
| 9,345,314 | B2* | 5/2016 | Henningsen ............ | B60S 3/045 |
| 2011/0188923 | A1* | 8/2011 | Lafleur .............. | A46B 15/0081 403/53 |

FOREIGN PATENT DOCUMENTS

WO    WO-2019241894 A1 * 12/2019    ............... B25G 1/06

\* cited by examiner

*Primary Examiner* — Katina N Henson
(74) *Attorney, Agent, or Firm* — Quickpatents, LLC; Kevin Prince

(57) ABSTRACT

The present invention is a snow/ice cleaning tool for removing snow or ice or a combination of such from a vehicle windshield for also rotating the wiper arms to a rest position for cleaning and returning the wiper arms to a working position in contact with the windshield. The cleaning tool has an elongated handle having one or more working ends incorporating snow/ice cleaning devices. Connected to the handle and slanting away from the handle axis is a grasping device with an opening therein for grasping the wiper arms. The present invention allows for the user to lift and lower the wiper arms from either side of the vehicle in a manner that is safe and ergonomic, regardless of the direction in which the wiper arms pivot.

19 Claims, 15 Drawing Sheets

DETAIL B

DETAIL B

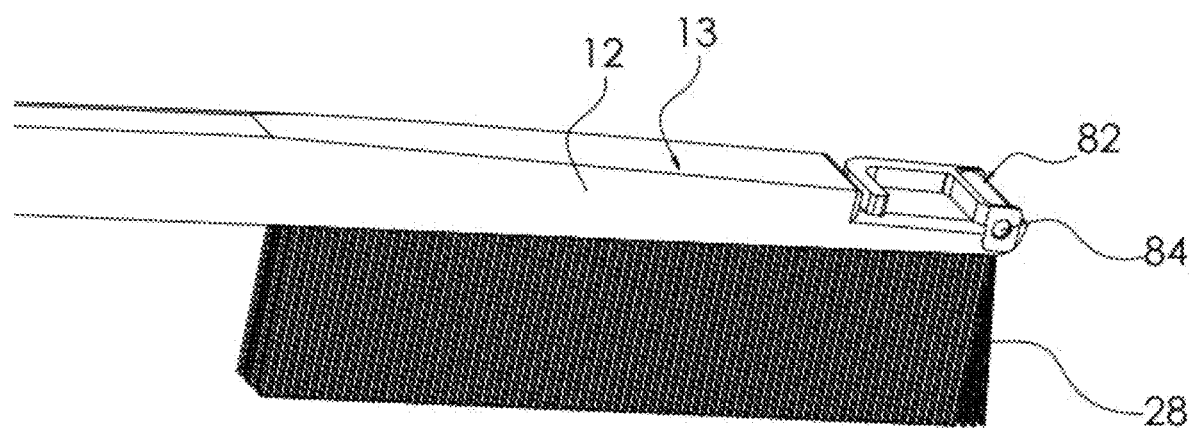
FIGURE 10-A
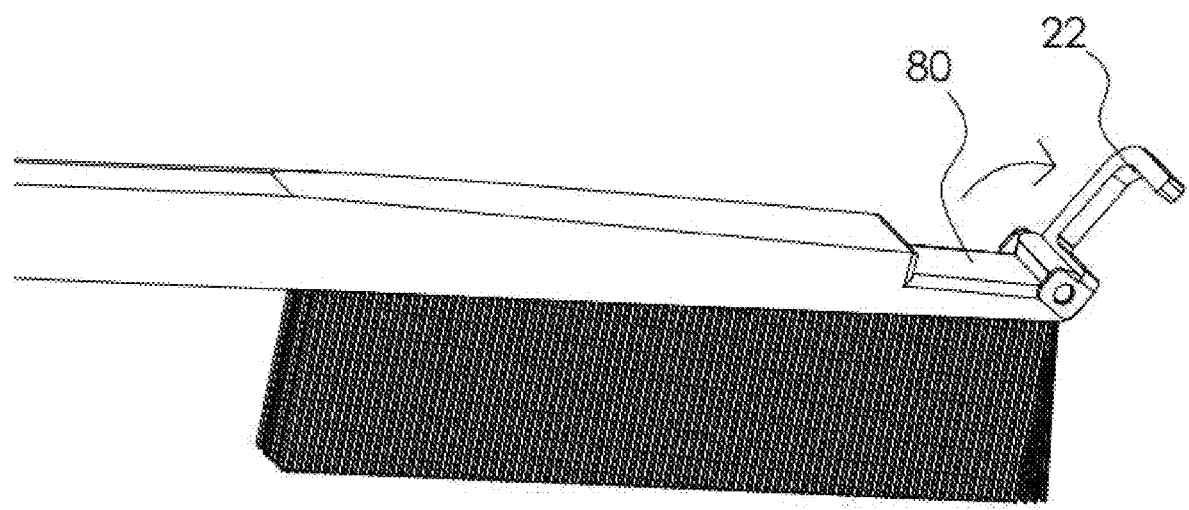
FIGURE 10-B

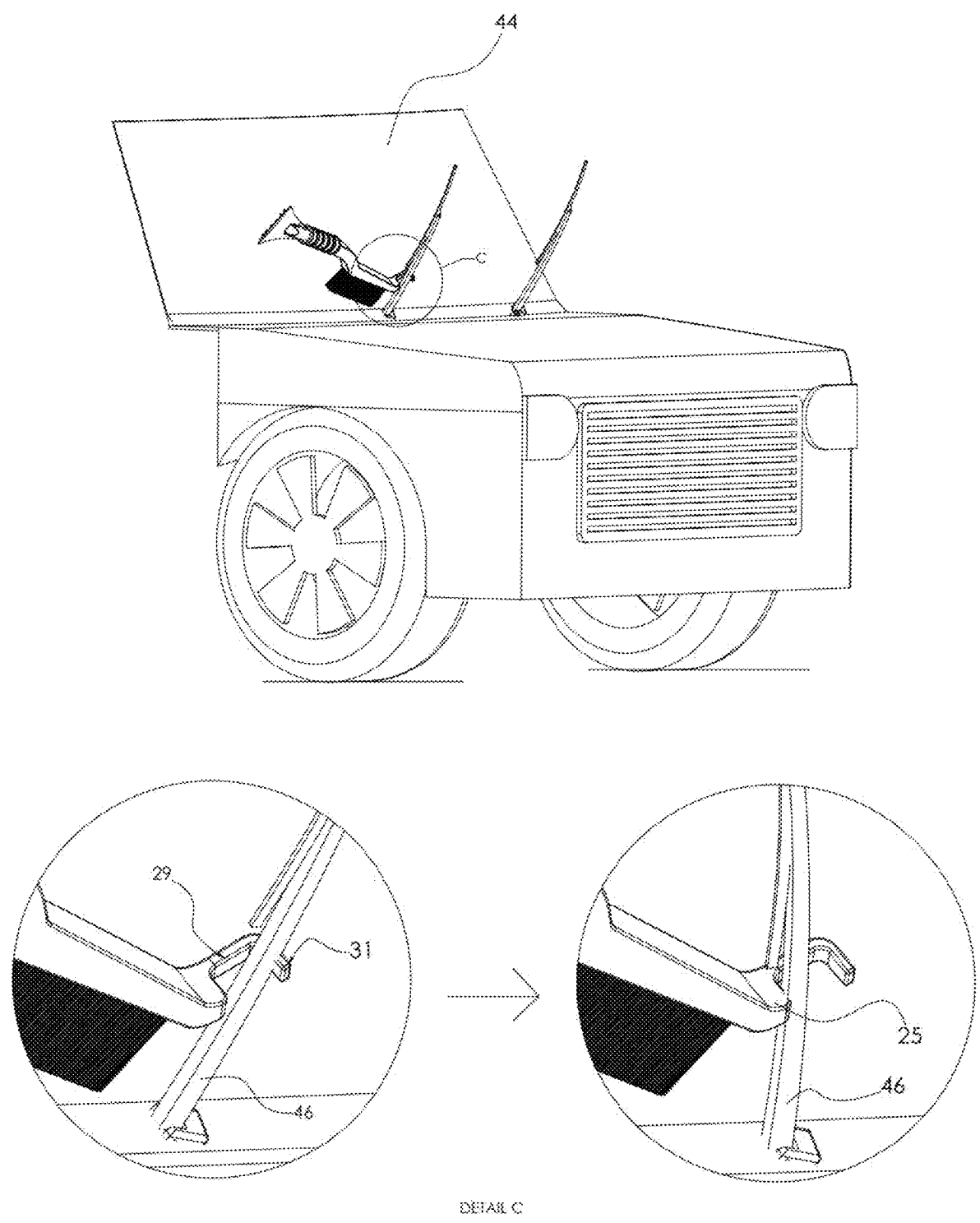
FIGURE 12-A

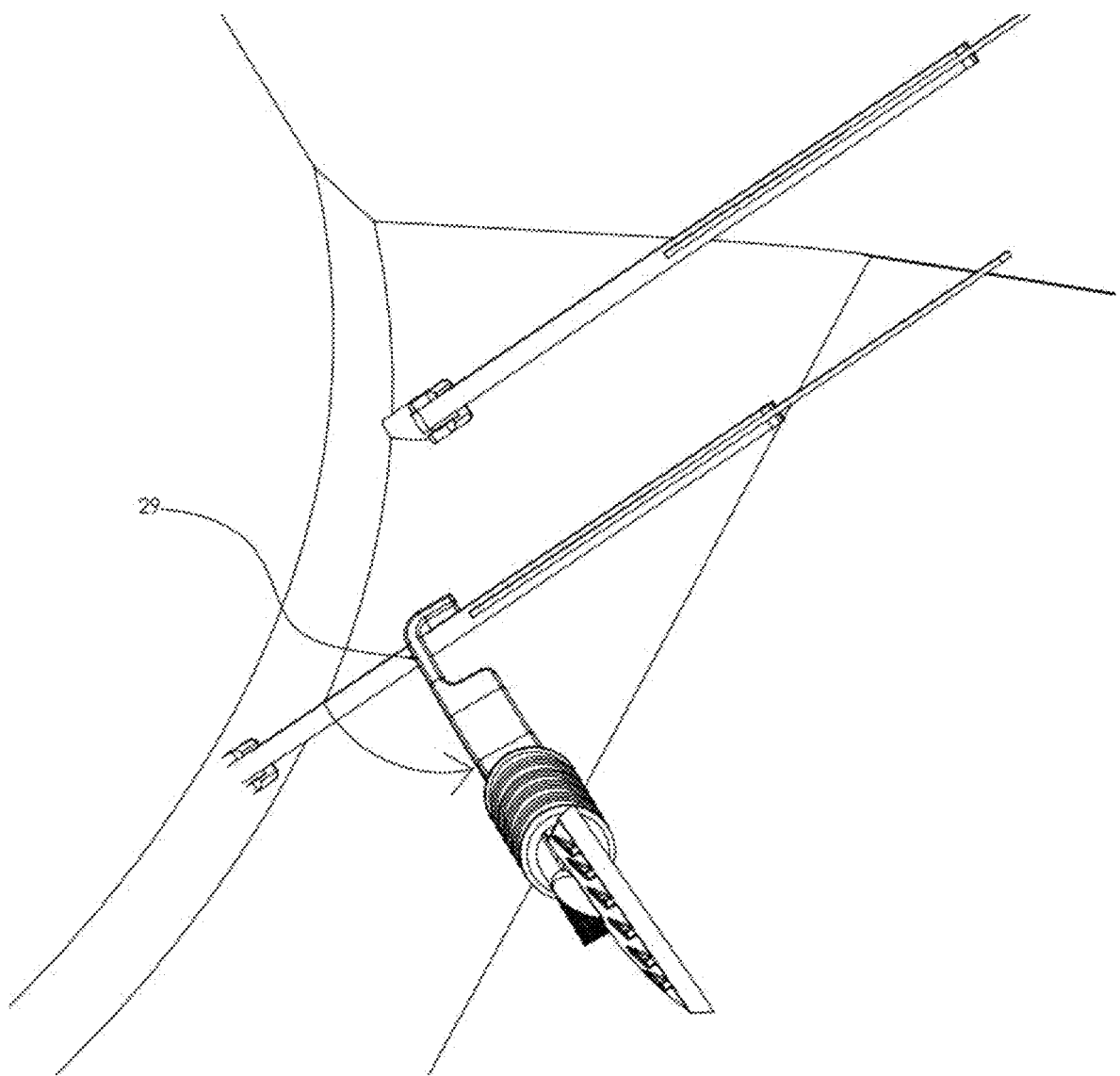
FIGURE 12-B

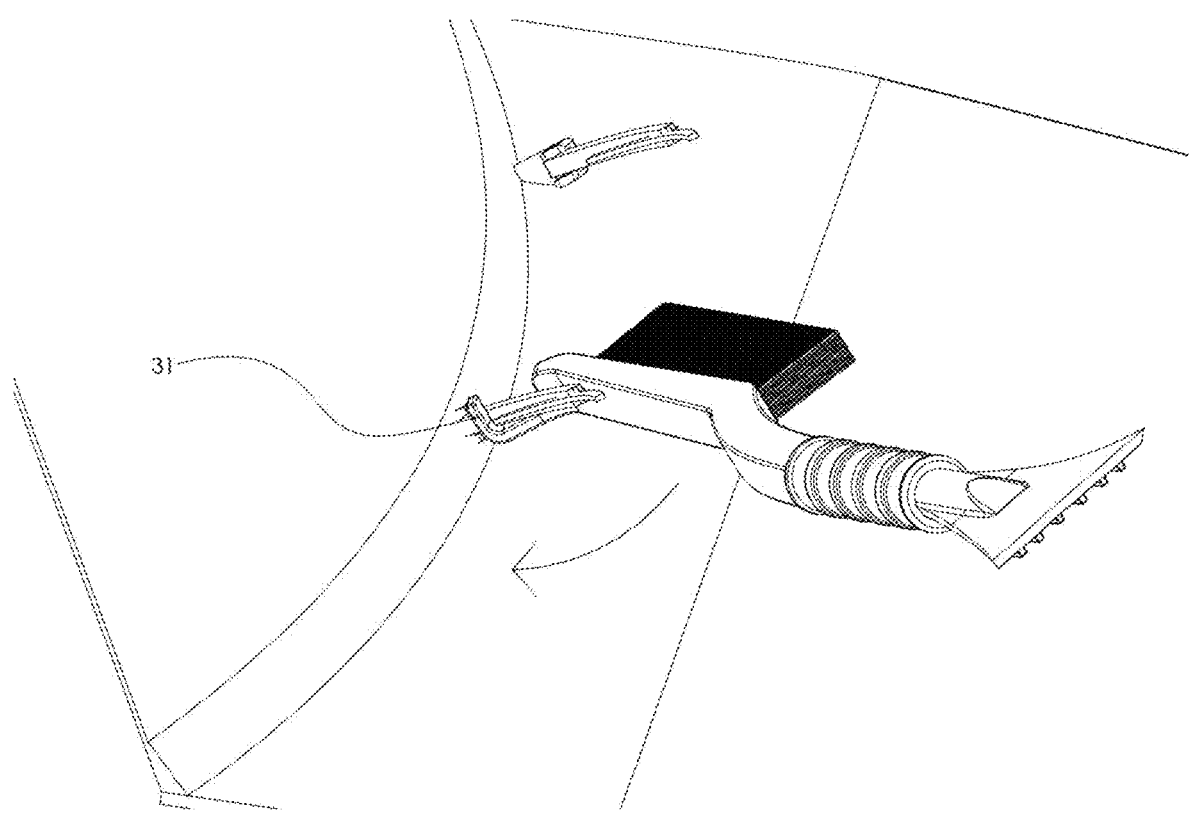
FIGURE 12-C

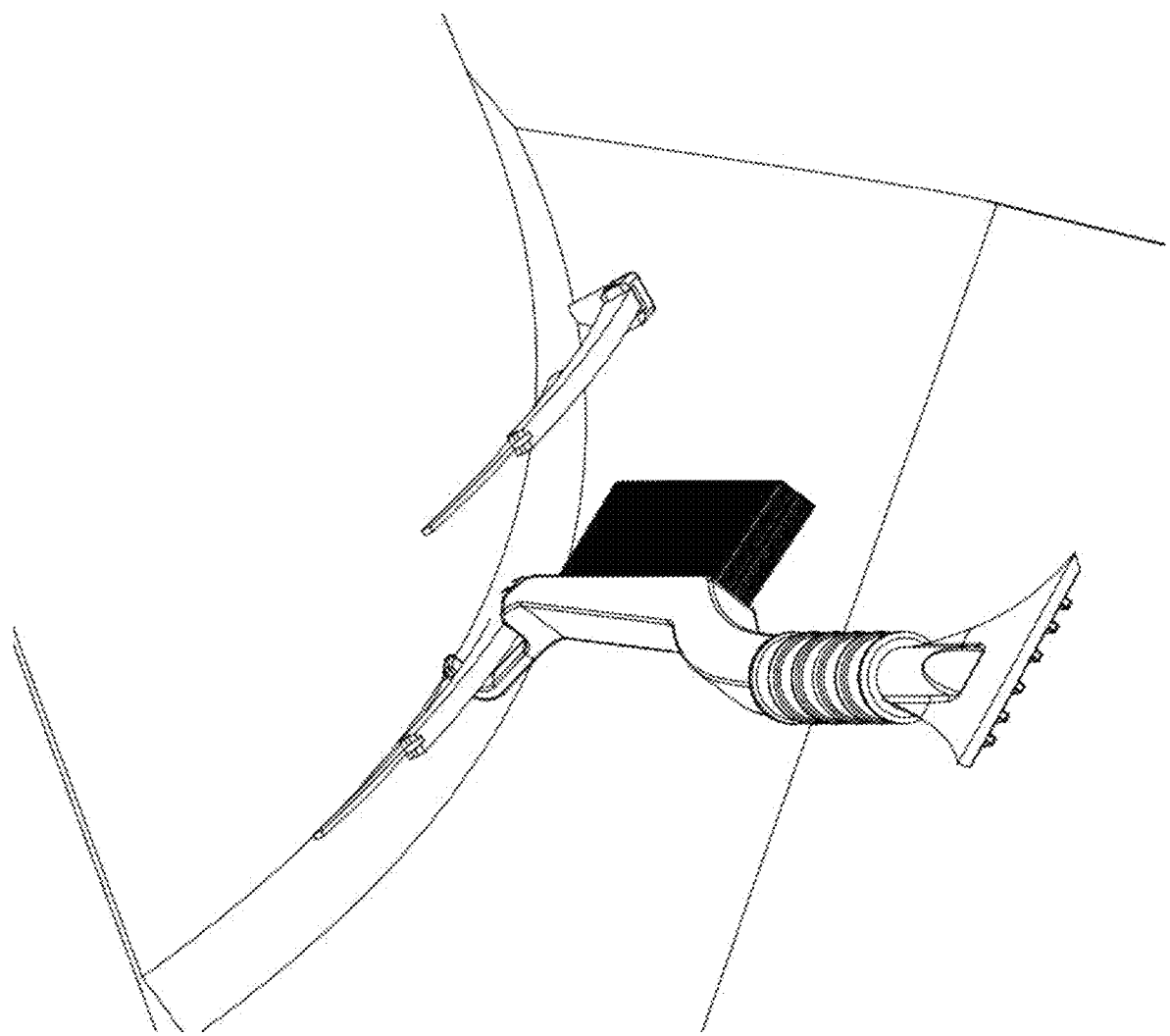
FIGURE 12-D

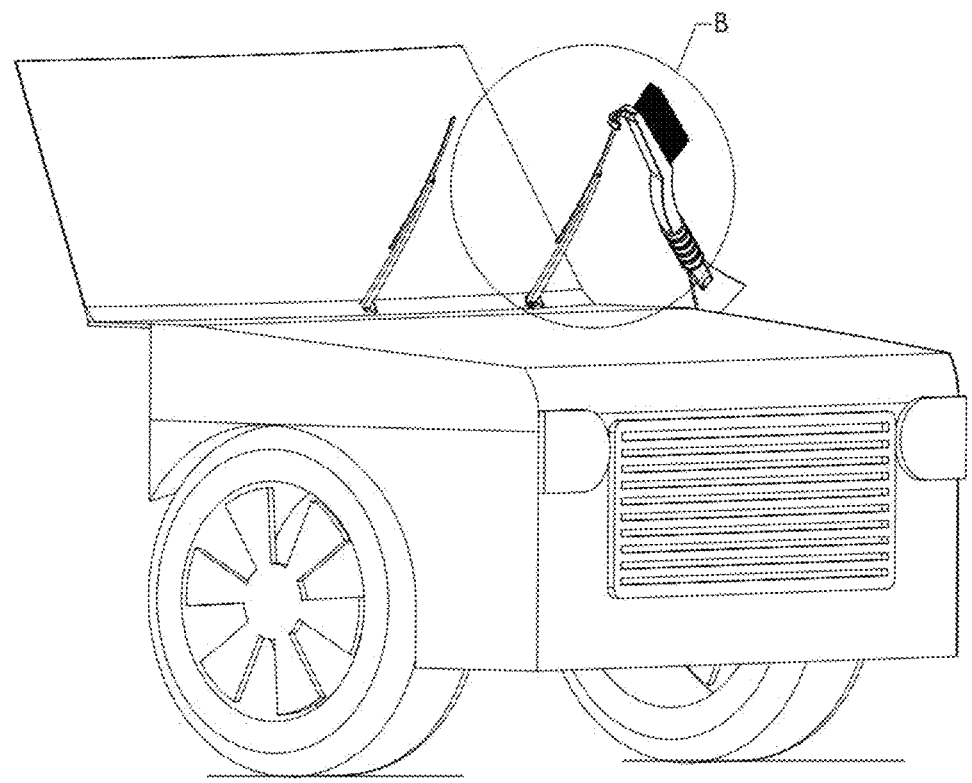
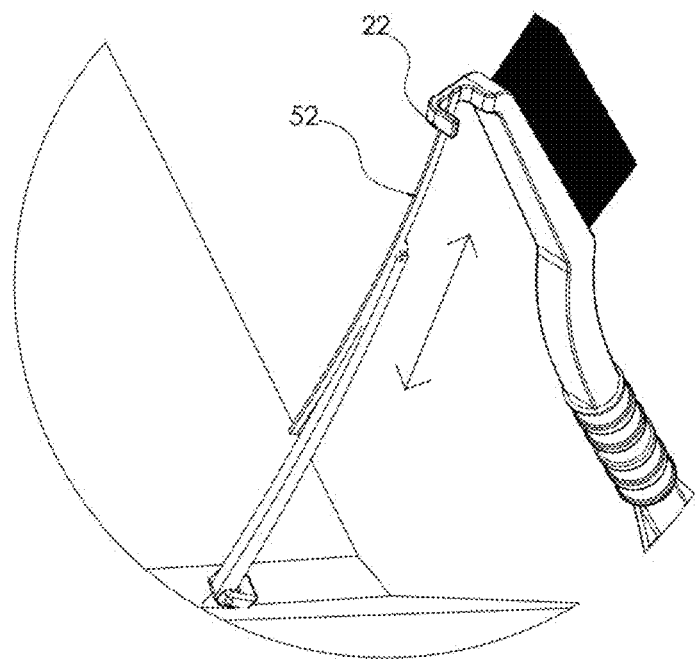
DETAIL B
FIGURE 13

SNOW/ICE CLEANING TOOL AND METHOD

CROSS REFERENCES TO RELATED APPLICATIONS

The present application depends from a provisional application having Ser. No. 62/822,967, titled "Snow Cleaning Tool with Wiper Grasping Feature", filed Mar. 24, 2019, by the same inventor.

REFERENCE TO FEDERALLY SPONSORED RESEARCH OR DEVELOPMENT

N/A

REFERENCE TO JOINT RESEARCH AGREEMENTS

N/A

REFERENCE TO SEQUENCE LISTING

N/A

FIELD OF THE INVENTION

The present invention relates generally to tools used to clean vehicles, and more particularly, relates to tools used to clean vehicles with snow and ice thereon, and, in greater particularity, relates to a snow/ice cleaning tool for cleaning vehicle windshields.

BACKGROUND OF THE INVENTION

When cleaning a vehicle of snow and ice, a user commonly uses a tool to help in the process. There are many types of tools over the years that have been created to help clean snow and ice from vehicles such as brushes, scrapers, pushers and squeegees.

Ultimately, the purpose of the tool is to aid the user in cleaning the vehicle in a manner that is safe, effective and ergonomic. This can often be a difficult task due to the various shapes and sizes of vehicles, as well as the slippery terrain in which the task must be performed.

One of the most important areas to clean on a vehicle is the windshield. The windshield must be cleaned in order for the driver to see the road clearly while operating the vehicle. Located at the base or above the windshield are the windshield wipers. The purpose of the windshield wipers is to mechanically wipe the windshield clear of debris during operation. The wipers pivot at their base where they are controlled by a rotational motor. It is especially important to keep the base of the wipers clear of snow and ice in order for the wipers to rotate freely and effectively clean the windshield for the driver.

The wipers can be maneuvered in such a way where they are either contacting the windshield in their working position, or pulled away from the face of the windshield into a rest position where the wiper blade is not contacting the windshield. The rest position is typically used when changing the wiper blade during maintenance. This rest position can also conveniently be used when cleaning snow and ice from the windshield. Currently, if the user is able to reach the wipers, they can grab and maneuver the wipers into the rest position where they are farthest from the windshield. In this position it becomes easier to clear snow from the base of the wipers, cowl area and windshield cleaning fluid nozzles. If the wipers are not moved to the rest position, the snow and ice is harder to remove. If excess snow is left on the windshield it can turn to ice and inhibit the effectiveness of the windshield wipers even further.

When the user is reaching for the wipers, they often have to lean against the vehicle, extend their arm to grasp and maneuver the wipers into position. This can result in the user getting wet from the moisture on the vehicle. By having to extend their body to reach the wipers, it creates an unsafe situation where the user can lose balance on the potentially slippery terrain.

Several prior art patents are: US Pat. Appl. Publication 2004/0250365 discloses a snow/ice scraper with a forked end that could be used to lift the wiper arm, but is used for ice scraping. The device is extendable; US Pat. Appl. Publication 2010/0186183 discloses a snow/ice scraper with a handle end; US Pat. Appl. Publication 2010/0306947 discloses an extended ice scraper with a hand holding device; U.S. Pat. No. 5,251,351 discloses a multi-functional tool have a hooked end for cutting belts; U.S. Pat. No. 9,027,186 discloses a snow shovel with a T-shaped handle end for a battery compartment that may be used as a hook; U.S. Pat. No. 10,065,611 discloses a flexible cleaning implement that could be used to lift a wiper. U.S. Pat. No. 5,913,558 shows a tool for moving the wiper blades wherein one or more hooks are placed on the working end having a scraper or sponge thereon. All prior art is incorporated by reference herein.

Accordingly, there is a need for a device to be able to move wiper blades in a controllable manner and also remove snow and ice from windshields and wiper blades. There is also a benefit to be able to engage with and move the wipers while standing on either side of the vehicle, safely and ergonomically regardless of which direction the wipers are manufactured to pivot.

SUMMARY OF THE INVENTION

The present invention is a snow/ice cleaning tool for removing snow or ice or a combination of such from a vehicle windshield and for also rotating the wiper arm to a rest position away from the windshield for cleaning around the blades, cowl and also around the pivot area and then returning the wiper to a working position in contact with the windshield. The tool enables raising and lowering of the wiper arms in a controlled manner from either side of the vehicle. The tool also has the ability to remove ice build-up on wiper blades. The tool has an elongated handle with snow/ice cleaning implements such as a brush, scraper or foam pusher at one or both ends. The tool has a grasping device that can be located at either end of the handle and used to maximize the working distance of the user. The grasping device is a hook slanted away from the handle axis with an opening therein for grasping the wiper arm. The C-shaped hook is used to grasp the wiper arm and enable the user to raise and lower the wiper arm from a safe and stable position.

An object of the present invention is to provide a snow/ice cleaning tool with a grasping device for moving a wiper arm on a vehicle windshield away from the glass so that cleaning can occur more efficiently and safely than if the wiper arms remained in place or the user had to reach and maneuver them by hand.

It is another object of the present invention to provide a snow/ice cleaning tool having the ability to clean ice build up off of wiper blades.

It is a further object of the present invention to provide a snow/ice cleaning tool having a sufficient length of handle with the grasping device thereon so that the user does not have to lean onto the vehicle.

It is still a further object of the present invention to provide a grasping device that can move the wiper arm to a rest position away from the windshield.

It is still a further object of the present invention to provide a grasping device on a tool that may be used from either side of a vehicle.

It is still another object of the present invention to provide a grasping device that may be stored on the tool when not required for use.

These and other objects, features, and advantages of the present invention will become more readily apparent from the attached drawings and the detailed description of the preferred embodiments, which follow.

BRIEF DESCRIPTION OF THE DRAWINGS

FIG. 10A shows a snow/ice cleaning tool with a storable and rotatable grasping device in a closed position; and FIG. 10B is the same as FIG. 10A but the grasping device has been rotated into a working position and is ready for use;

FIGS. 12A TO 12D illustrate the detailed method use of the tool from the passenger side of the vehicle;

FIG. 13 illustrates the ability of the grasping device to clean ice build-up from wiper blades.

Like reference numerals refer to like parts throughout the several views of the drawings.

DETAILED DESCRIPTION

Figure 1:
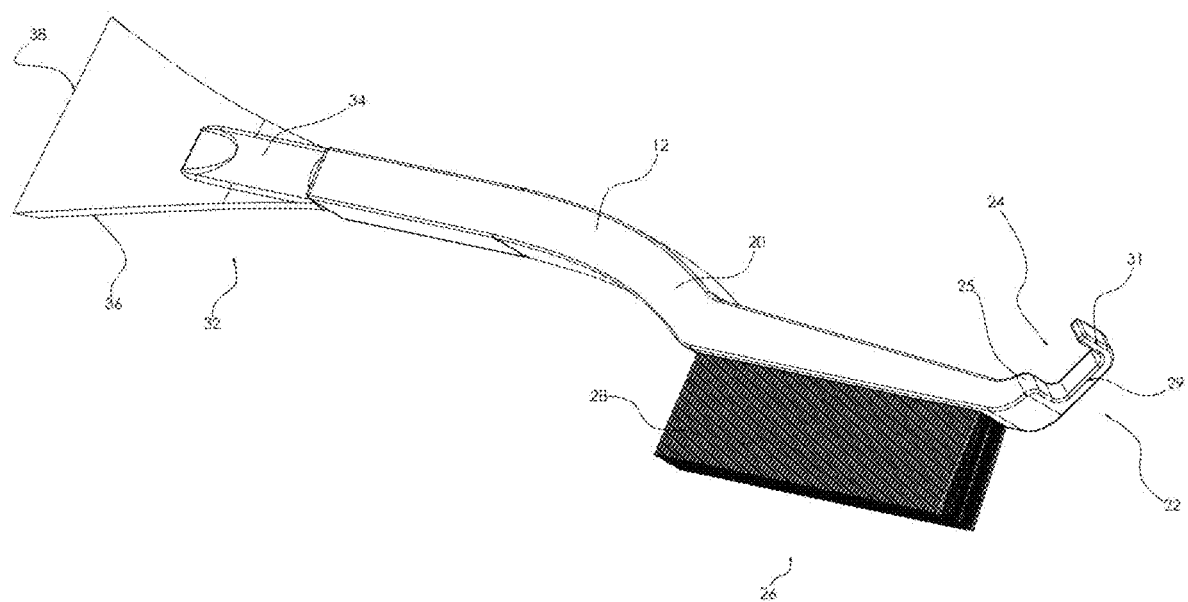
FIG. 1 is a side perspective view of a snow/ice cleaning tool with a snow brush along the handle.
Figure 2:
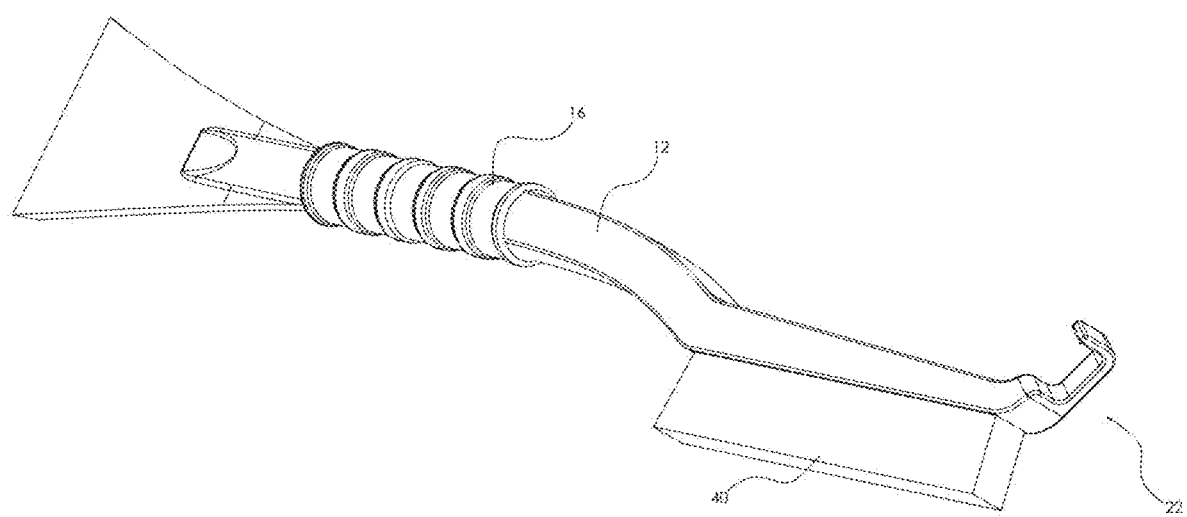
FIG. 2 is similar to FIG. 1 but with a hand grip on the elongated handle and foam instead of bristles.
Figure 3:
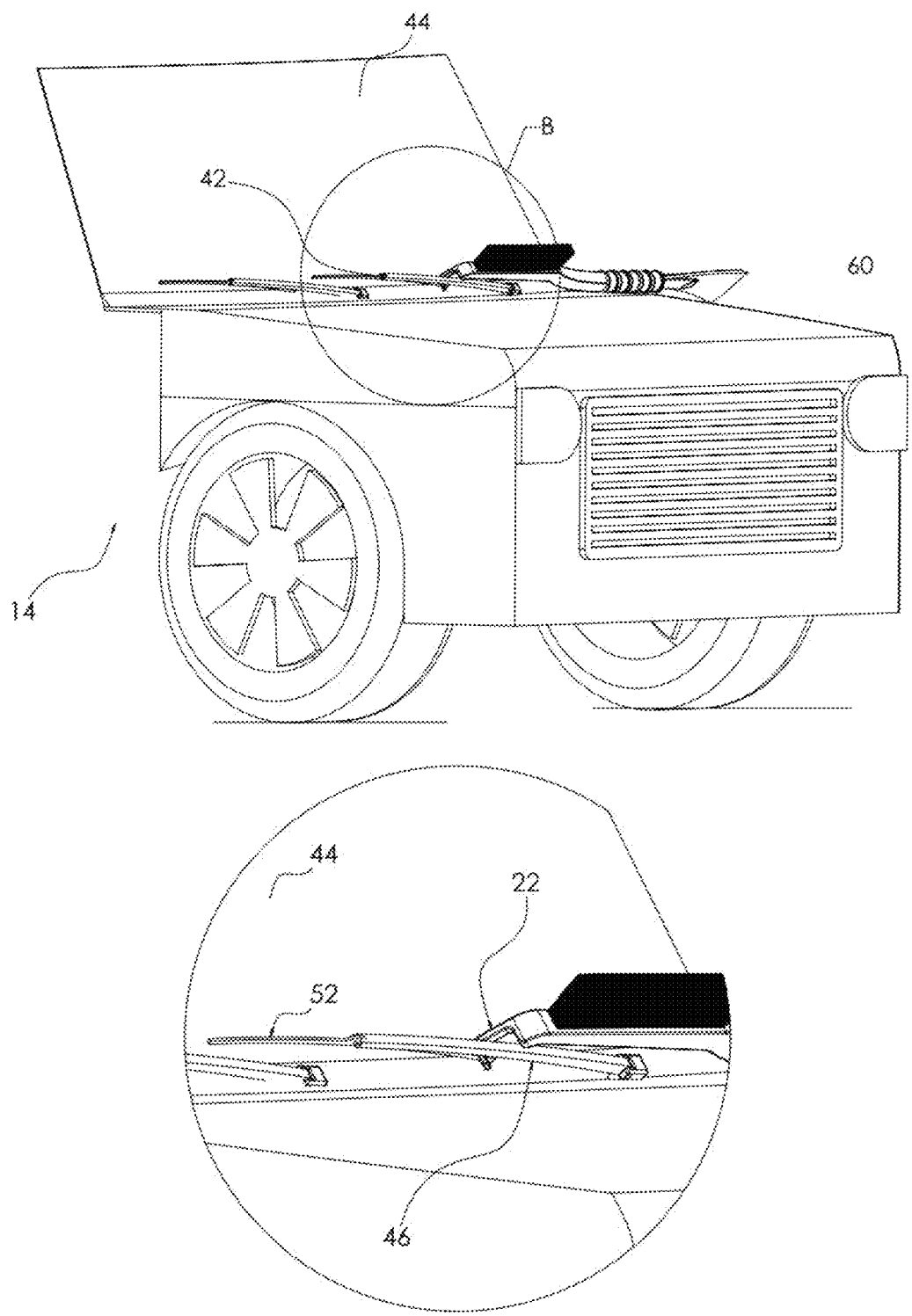
FIG. 3 shows a snow/ice cleaning tool engaging the grasping device with the wiper arm from the driver side of a vehicle.

FIG. 1 illustrates one embodiment of a snow/ice cleaning tool in accordance with the present invention. An elongated handle 12 is gripped by a user, not shown. The handle 12 may be straight or bent slightly as shown in FIG. 1, for example, in a way to promote ergonomics and hand clearance when cleaning snow from a vehicle 14, FIG. 3. The handle 12 may include a hand grip cushion 16, FIG. 2, such as a soft rubber cushion but not limited to such. The handle 12 may be solid or hollow, but strong enough to support the action of the user clearing snow and ice from the vehicle 14. The cross section of the handle may be circular 18, FIG. 7, oblong rectangular 20, FIG. 1, or any sufficient shape as to be manufactured in a manner that is common in the art. The handle 12 may be manufactured in similar methods that are used in the industry. One method would be injection molding with a polymer plastic or similar material/process in the industry that will not scratch the glass or paint of the vehicle and can include the grasping device located at the extremity of the tool. In FIG. 1 the grasping device 22 protrudes from the backside of the handle in proximity to where the snow cleaning brush end 28 is located. The grasping device 22 is a C-shaped hook and extends away from the axis of the handle body at an angle of 45 degrees +/−30 degrees. As previously stated, the grasping device 22 can be manufactured in the same manufacturing process as the handle 12 but is not limited to other processes or steps. By manufacturing it in the same step, the overall number of parts in the assembly is reduced when compared to the prior art. It is beneficial to have the grasping device on the same plane as the handle axis to promote good posture and force application for the user. This is an improvement over the prior art as well. The grasping device 22 is designed to wrap partially around the body of the wiper in order to controllably move the wiper to a resting or working position as seen in FIG. 3. The grasping device 22 is "C"-shaped with an opening 24. The grasping device 22 may be located on the snow cleaning end 26, as shown in FIG. 1, or on the ice scraper end 32. The snow cleaning end 26 is coupled to the handle 12 in a manner common in the art and may be integrally formed. The brush 28, being longitudinal to the handle 12, can be inserted directly into the handle or in a manner that is common in the art as well. The snow cleaning end 26 can be constructed as a traditional brush with bristles or made with a flexible material such as foam 40 as shown in FIG. 2. On the ice scraper end 32 of the handle 12 is an ice scraper 34 having a blade 36 with a sharpened edge 38. The ice scraper 34 is coupled to the handle 12 in a manner that is secure and supports the force applied during usage. The handle 12, the ice scraper 34 and brush 28 may be integrally formed as one piece. This can be done in any number of ways such as pins, adhesives, press fittings or any other method similarly known in the art. The ice scraper 34 can be injection molded with a polymer suitable in the industry but is not limited from other materials or methods. The user will grip the handle 12 between the ice scraper end 32 and the snow cleaning end 26.

The grasping device 22 has a base 25 forming the bottom leg of the "C" and connected to the handle 12. Connected to the base 25 is a side long leg 29 and to that a short top leg 31.

FIG. 2 illustrates the handle 12 including a hand grip cushion 16 to improve the users' grasp on the handle 12.

Also depicted is the substitution of a foam brush 40 instead of the snow brush 26. The ice scraper 34 and grasping device 22 are similar to those described previously.

FIG. 3 illustrates a vehicle with the wipers 42 in a working position. The wiper is generally comprised of the pivot 48, wiper blade 52 and wiper arm 46. The user can stand on the driver side of the vehicle 14 and extend the tool towards the windshield 44 where the wipers 42 are positioned. Shown in the detail view is a method for engaging the grasping device 22 around the body of the wiper arm 46. From this position, the user has an improved leverage position and can lift the wiper arm 46 away from the windshield 44 and into the rest position as shown in FIG. 4.

Figure 4:
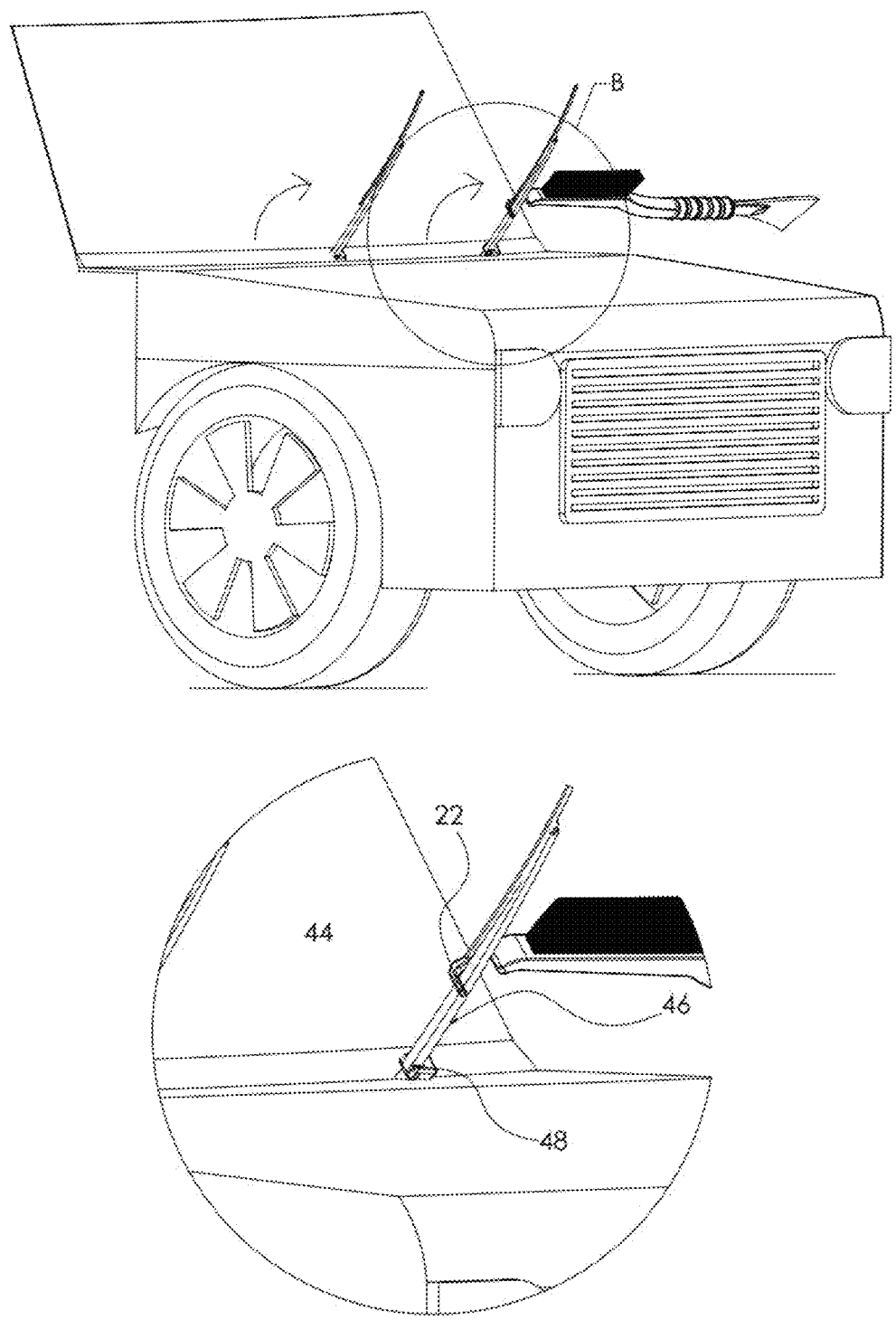
FIG. 4 shows a snow/ice cleaning tool using the grasping device to lift the wiper arm to the rest position.

FIG. 4 illustrates when the wipers have been lifted into the rest position away from the windshield 44. The user can then proceed to clean the windshield 44, wiper blade 52 and pivots 48 of snow and ice. The cowl area and windshield washing fluid nozzles can also be cleaned. Once cleaning of snow/ice is completed, the user can then lower the wipers 42 in the reverse order that they were raised. FIGS. 12A TO D show the tool being used from the passenger side of the vehicle.

Figure 5:
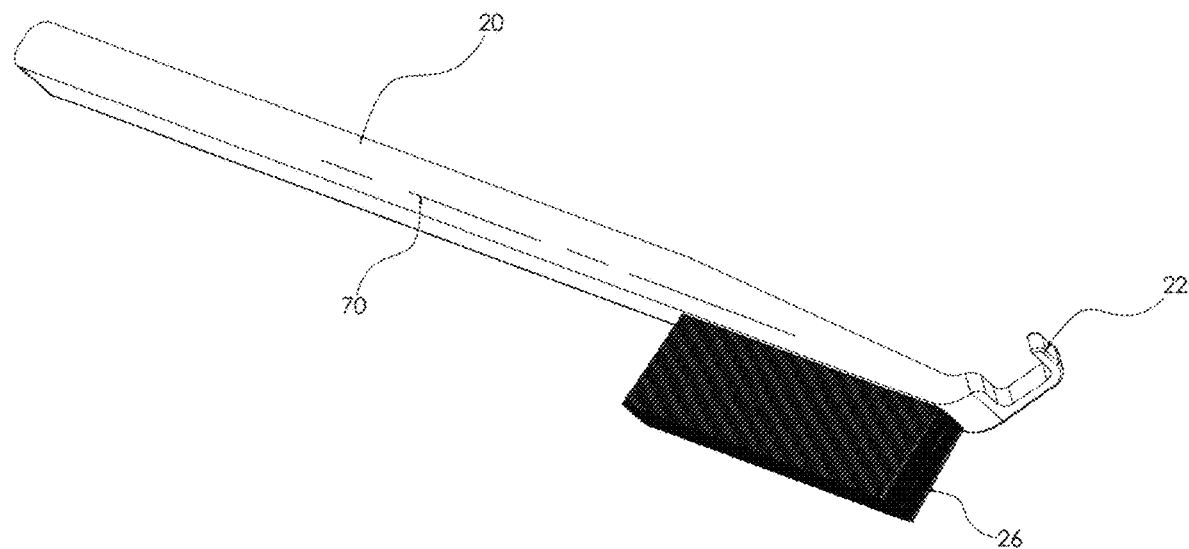
FIG. 5 shows a snow/ice cleaning tool with a generally straight handle.

FIG. 5 illustrates an embodiment in accordance with the present invention where the handle 20 is an elongated, generally straight member that has a snow brush 26 at one end with a grasping device 22 on the backside. The grasping device 22 should be composed of a polymer or similar material to prevent scratches on the vehicle surface.

Figure 6:
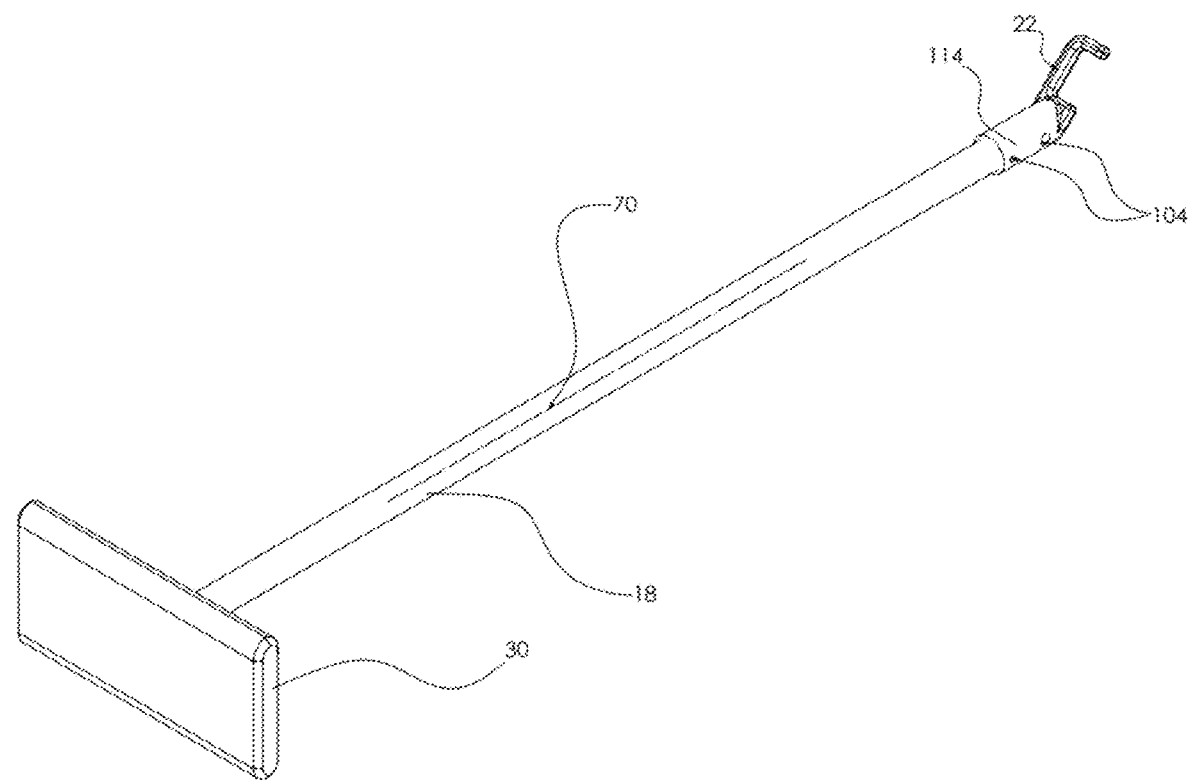
FIG. 6 shows a snow/ice cleaning tool with the grasping device on one handle end and a foam snow pusher on the other end.

FIG. 6 illustrates a further embodiment in accordance with the present invention where the handle 18 is an elongated straight member that has a snow pusher 30 made of foam on one end that is perpendicular to the handle axis 70. The handle 18 can be metal or plastic or any similar material used in the industry as long as it supports the action and function of the tool. The grasping device 22 will be located on the opposite end of the snow pusher 30. The user would have to turn the tool around in order to use the grasping device 22 to raise or lower the wipers 42. The grasping device 22 should be composed of a polymer or similar material to prevent scratching the vehicle. The grasping device can be injection molded as one component 114 to include holes 104 to accommodate a retail hook and a means to rigidly attach to the handle 18 in means similar to what is common in the industry. The grasping device in this embodiment should have a recess to accept the shaft of the handle and may also include enough material to serve as a hand gripping location.

Figure 7:
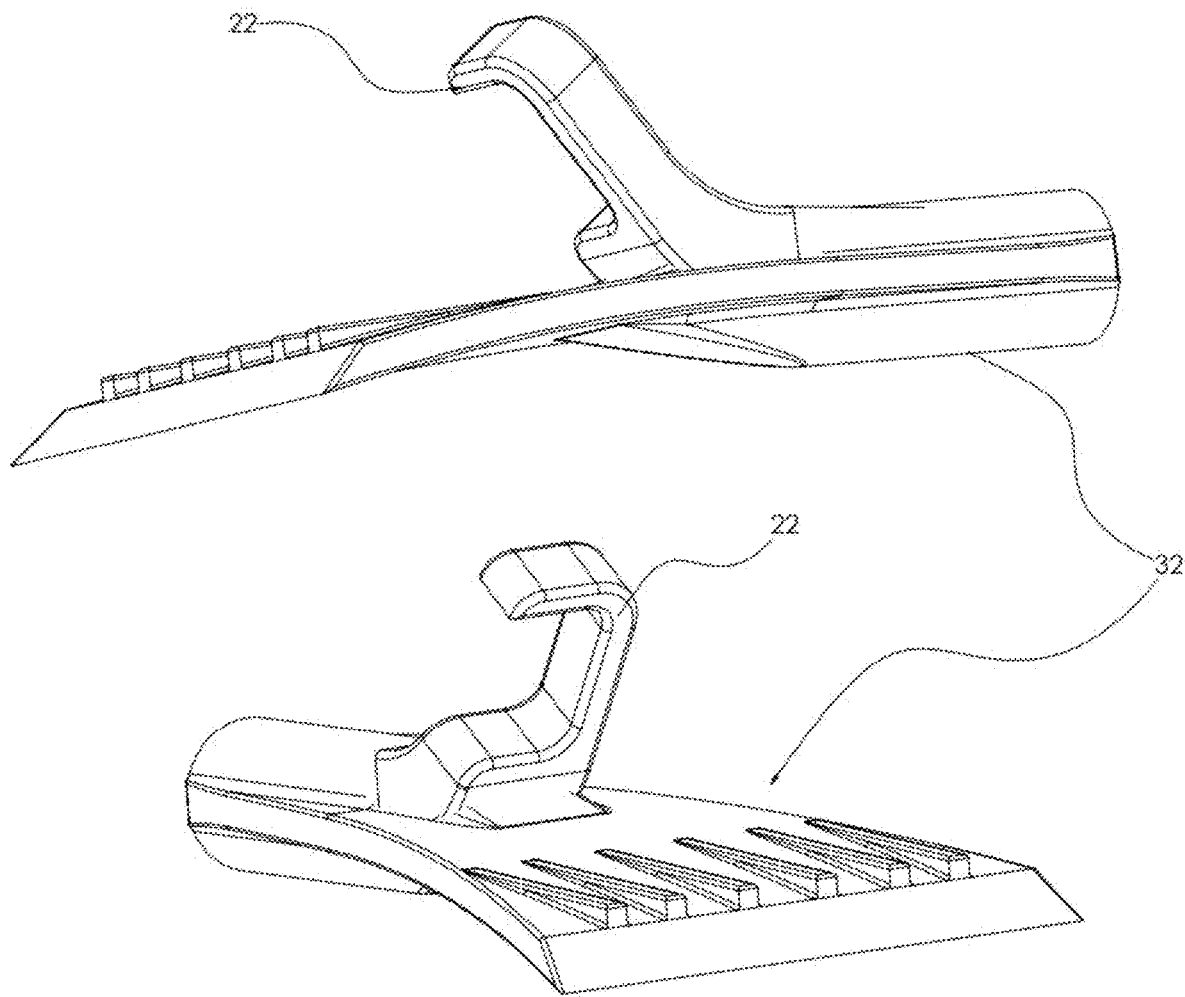
FIG. 7 shows a grasping device integrated with an ice scraper.

FIG. 7 illustrates a further embodiment in accordance with the present invention where the ice scraper 32 can be manufactured to include the grasping device 22 of the present invention on the same end. The scraper 32 can then be rigidly coupled to any variety of snow cleaning tools in a familiar manner as known in the industry. The ice scraper can be manufactured of any polymer familiar in the art. The grasping device 22 can also be attached as a separate piece to the scraper 32 by press fitment or similar method known in the art.

Figure 8:
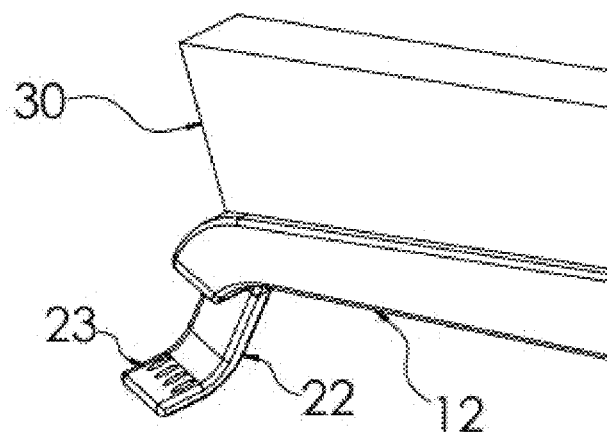
FIG. 8 shows a snow/ice cleaning tool with the grasping device in detail with gripping means therein to help grasp or clean the wiper blades.

FIG. 8 illustrates a further embodiment in accordance with the present invention where the handle 12 is coupled with the grasping device 22 which has friction enhancing features 23 that promote an improved coupling when maneuvering the wipers, as well improved ability to remove ice build-up from the wiper blades 52 as shown in FIG. 13. These can be molded as part of the grasping feature as ribs, ridges, a textured surface or any other means known in the industry to promote gripping the wiper blade 52 or wiper arm 46. The snow brush 28 or foam pusher 30 is located on the backside of the grasping device 22 as shown in previous embodiments.

Figure 9:
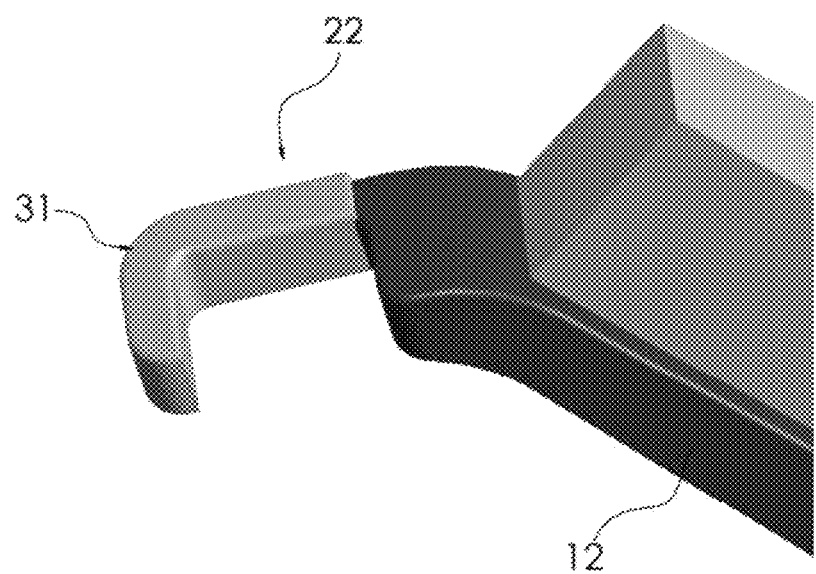
FIG. 9 shows the grasping device with a polymer coating thereon.

FIG. 9 illustrates a further embodiment in accordance with present invention where the grasping device 22 may be over molded 31 in a softer durometer material to promote better engagement as similarly stated for FIG. 8 and to prevent scratching of the vehicle.

FIGS. 10A and 10B illustrate a further embodiment in accordance with the present invention where the handle 12 has a snow cleaning brush 28 mounted in a similar manner to what has been shown in previous embodiments. The handle 12 has a cutout 80 on the topside 13 to allow for the grasping device 22 to be efficiently stored by a rotational hinge 82. The storage position can be seen in FIG. 10A. The grasping device 22 can rotate about a point 84 so that it can be rotated into functional position (as shown in FIG. 10B) when needed for use. After use, it can be rotated back into storage position in order to store more efficiently. The grasping feature will rotate to a certain angle and be stopped by a hard stop or a feature which temporarily locks it into position such as a detent in the hinge 82. The grasping device 22 can then be used until the user applies a force large enough to overcome the locking feature, and returns it to the storage position.

Figure 11:
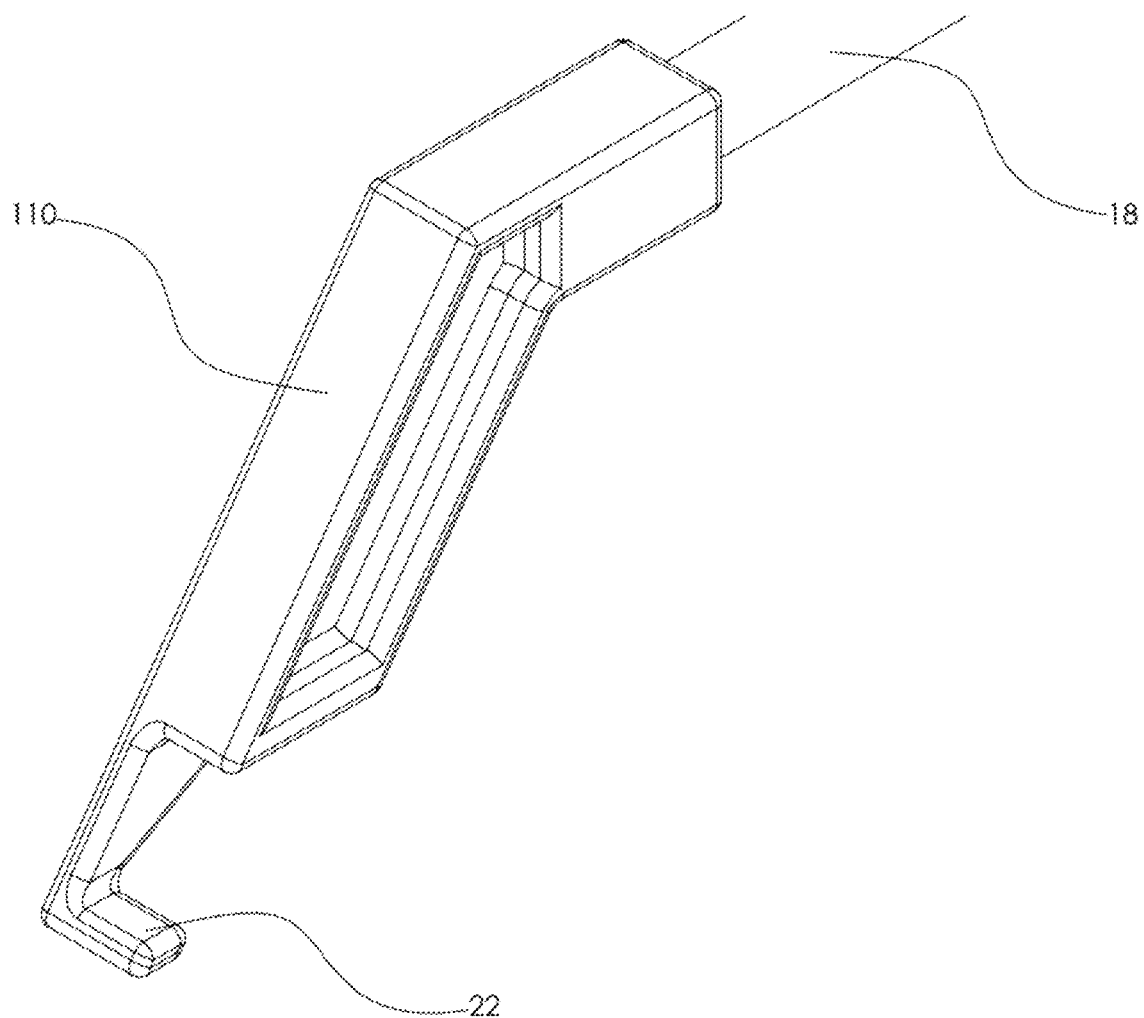
FIG. 11 is a perspective view of another embodiment of the grasping device integrated into a hand-grip.
Figure 14:
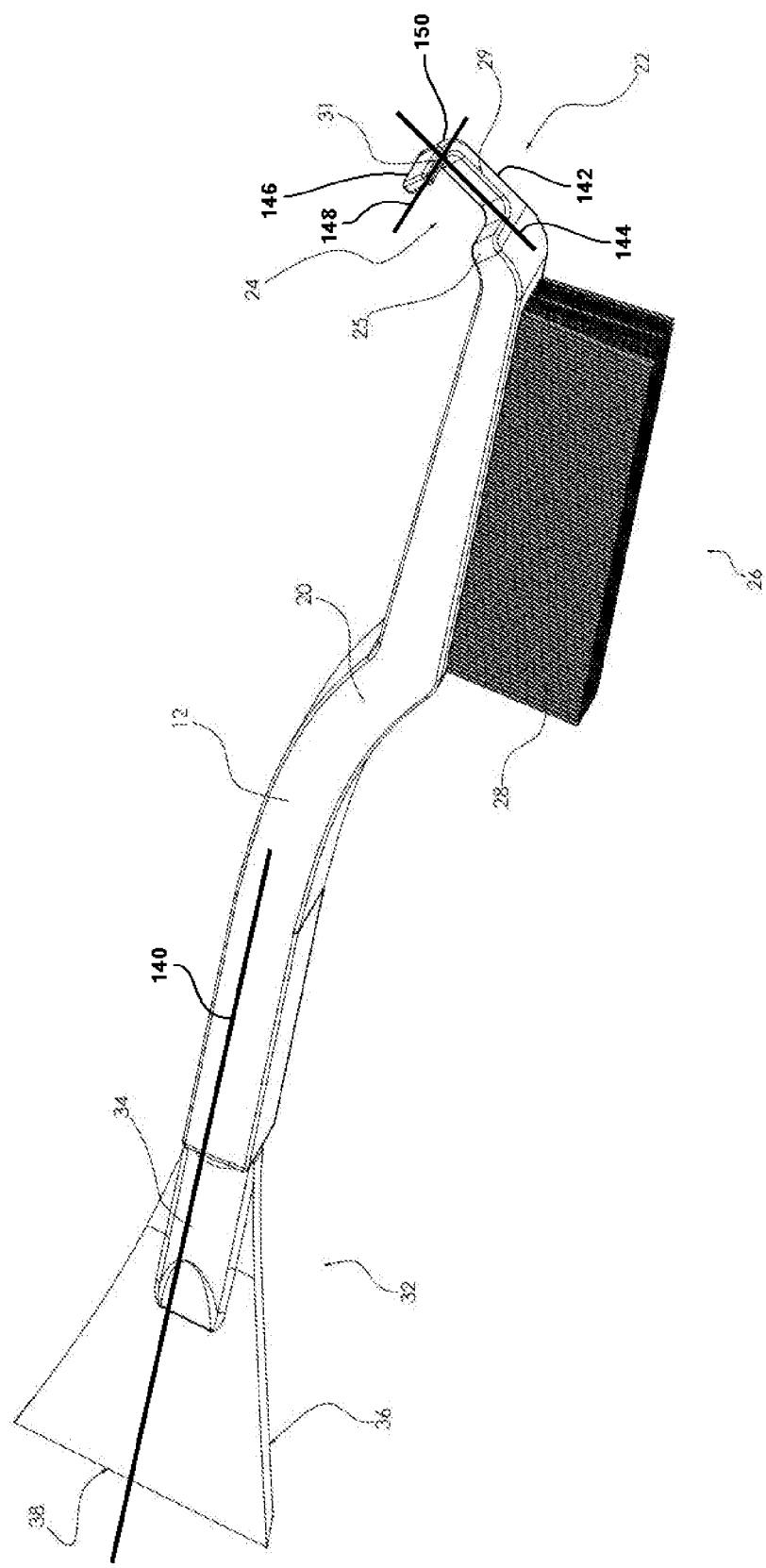
FIG. 14 illustrates a longitudinal axis 140 of the handle of the device of FIG. 1, where FIG. 14 further shows a first arm 142 of the grasping device, a second arm 146, extending from a distal end 150 of the first arm 142, where the first arm 142 defines a first arm axis 144 that forms a first angle with respect to the longitudinal axis 140, and the second arm 146 defines a second arm axis 148 that is orthogonal to a plane, tangential to a side of the elongated handle and parallel with the longitudinal axis 140.
Figure 15:
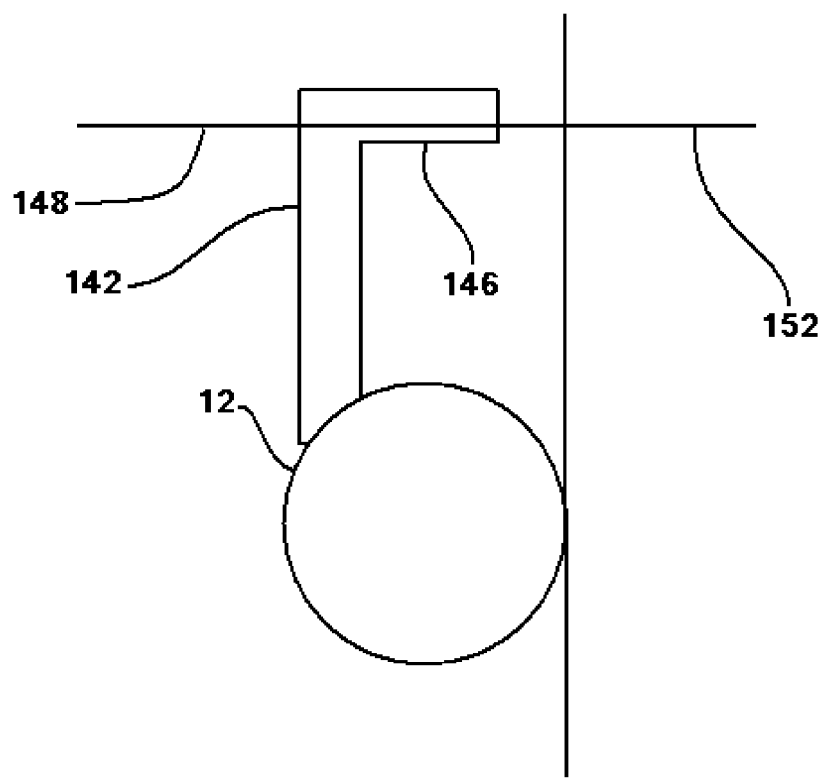
FIG. 15 illustrates an end view of a device having an elongated handle 12, showing the first arm 142 with a second arm 146 extending therefrom, with the second arm axis 148 intersecting a side tangential plane 152 of the elongated handle 12.

FIG. 11 illustrates another embodiment of the grasping device 22 integrated into a hand-grip 110 that is attached to a handle 18. The opposite end of the handle 18 has a typical snow/ice moving device such as seen in the previous embodiments. One example is a snow pusher made of foam as seen in FIG. 6. The grasping device 22 is molded into the hand-grip 110 as a single piece. The material should be similar to the materials stated previously to inhibit scratching of the vehicle. The angle of the grasping device 22 should match that as previously stated in relation to the axis of the handle in FIG. 1.

FIGS. 12A to D illustrate a snow/ice cleaning tool with a grasping device 22 being used from the passenger side of the vehicle to lower the wiper 42 from a rest position to a working position. Regardless of the embodiment, the handle and grasping device are used in a similar method. The method outlined in FIGS. 12A to D promotes the most effective use of the tool in the safest manner for cleaning snow/ice from a vehicle.

FIG. 12A depicts the short top leg 31 of the grasping device 22 engaging around the body of the wiper arm 46. The short top leg 31 contacts the wiper arm 46 when the user pulls the tool towards them and in turn shifts the weight from the short top leg 31 to the grasping base 25. FIG. 12B depicts the counterclockwise rotation of the tool and grasping device 22 engagement with the wiper arm 46. This rotational action will shift the weight of the wiper arm to the side long leg 29 of the grasping device 22. FIG. 12C depicts the tool at the end of the 180 degrees of rotation where the weight is fully on the short top leg 31. The wiper arm 46 can then be controllably lowered to the working position against the windshield as shown in FIG. 12D. It is important to have control when maneuvering the wiper arms 46 because they have internal springs that can cause them to slap against the windshield 44 if not controlled. This can cause damage to the wiper blade 52 or the windshield 44. The prior art is deficient in this respect because the point of engagement is not in-line with the axis of the handle. The present invention also has an improved engagement/disengagement process when compared with the prior art. The present invention only requires the rotation of the handle axis to engage and disengage the grasping device 22 with the wiper arm 46.

FIG. 13 illustrates the ability to clean the ice from the wiper blade 52 with the grasping device 22. By sliding the C-shaped region along the wiper blade, the ice build-up can be removed to allow the blade to clean the windshield unimpeded and maximize efficiency.

The present invention provides a method of cleaning snow and ice from a vehicle windshield comprising the steps of: engaging the grasping device around a wiper arm and lifting the wiper arm to a rest position allowing for cleaning around the necessary areas and then lowering the wiper arm back to the working position.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A snow/ice cleaning tool for a vehicle windshield, said snow/ice cleaning tool comprising:
   an elongated handle, and
   a grasping device, said grasping device located on said elongated handle on one end, a user able to adjust a windshield wiper arm from either side of a vehicle to allow cleaning snow, ice, or a mixture from said windshield or about a wiper arm pivot,
   said grasping device being a C-shaped hook having a first arm extending along a first arm axis at a first angle of 45 degrees +/−30 degrees from a longitudinal axis of the snow/ice cleaning tool,
   the C-shaped hook having a second arm, extending at along a second arm axis from a distal end of the first arm to form an angle orthogonal to a side tangential plane that extends parallel to the longitudinal axis of the snow/ice cleaning tool, the grasping device able to grasp the wiper arm wherein said elongated handle is positioned in an essentially parallel manner to said wiper arm, the user being able to lift said wiper arm with said grasping device and move the wiper arm to a rest position from a working position wherein said wiper arm will remain in said rest position until moved therefrom.

2. The snow/ice cleaning tool as defined in claim 1, further including an ice scraper located on an end opposite to said grasping device.

3. The snow/ice cleaning tool as defined in claim 2, further including a snow cleaning device, said snow cleaning device being a brush mounted parallel to said elongated handle and on the one end with said grasping device.

4. The snow/ice cleaning tool as defined in claim 1, wherein said elongated handle has a snow pusher on the end opposite the grasping device.

5. The snow/ice cleaning tool as defined in claim 1, wherein
   said C-shaped hook is mounted on a side opposite to a brush if thereon.

6. The snow/ice cleaning tool as defined in claim 5, wherein said hook has a base section attached to said elongated handle, said base section attached to the first arm, said first arm is attached to the second arm, said first and second arms forming the C-shaped hook.

7. The snow/ice cleaning tool as defined in claim 3, wherein said grasping device is able to rotate on said elongated handle via a hinge.

8. The snow/ice cleaning tool as defined in claim 7, wherein said grasping device has a storage position and a working position of the grasping device.

9. The snow/ice cleaning tool as defined in claim 1, wherein said elongated handle is essentially straight or slightly bent.

10. The snow/ice cleaning tool as defined in claim 1 wherein said grasping device is made from plastic.

11. The snow/ice cleaning tool as defined in claim 1, wherein said elongated handle and said ice scraper are integrally formed.

12. The snow/ice cleaning tool as defined in claim 11, wherein said elongated handle and said ice scraper and said grasping device are integrally formed.

13. The snow/ice cleaning tool as defined in claim 1, wherein said grasping device includes ribs, ridges, or a textured surface on the inside surface of the C-shaped hook.

14. The snow/ice cleaning tool as defined in claim 1, further including a storage device for said grasping device.

15. The snow/ice cleaning tool as defined in claim 1, further including an extendable device in said elongated handle to be able to adjust a length of said elongated handle.

16. The snow/ice cleaning tool as defined in claim 1, further including a hand grip cushion on said elongated handle to enable better holding thereof.

17. A snow/ice cleaning tool for a windshield, said snow/ice cleaning tool comprising:
   an elongated handle, said elongated handle having an end having thereon an ice scraper, and the end opposite having thereon a brush; and
   a grasping device, said grasping device located on said elongated handle on said end with said brush being on the opposite side, a user able to adjust a windshield wiper arm to allow cleaning snow, ice, or a mixture from said windshield or about a wiper arm pivot,
   said grasping device located on a backside of said elongated handle and on an end of said elongated handle to maximize reaching distance,
   said grasping device being a C-shaped hook having a first arm extending along a first arm axis at a first angle of about 45 degrees +/−30 degrees from a longitudinal axis of the snow/ice cleaning tool,
   the C-shaped hook having a second arm, extending along a second arm axis from a distal end of the first arm to form an angle orthogonal to a side tangential plane that extends parallel to the longitudinal axis of the snow/ice cleaning tool, the grasping device able to grasp the wiper arm wherein said elongated handle is positioned in an essentially parallel manner to said wiper arm, the user being able to lift said wiper arm with said grasping device and move the wiper arm to a rest position from a working position wherein said wiper arm will remain in said rest position until moved therefrom;
   wherein
      said C-shaped hook mounted on a side opposite to a brush if thereon; and
      said opening facing to a right side when said brush is vertically oriented downward when the user holds said elongated handle.

18. A method of removing snow or ice or a mixture thereof from a windshield with the snow/ice cleaning tool of claim 1, comprising the step of:
   placing the C-shaped hook of said elongated handle about the wiper arm; and
   lifting the wiper arm to the rest position allowing for cleaning around the wiper pivot, and lowering the wiper arm from the rest position after removing snow or ice or a mixture thereof.

19. The method of removing snow or ice or a mixture thereof as defined in claim 18, further including rotating the C-shaped hook to a stored position.

\* \* \* \* \*